(12) United States Patent
Kanata et al.

(10) Patent No.: US 11,999,604 B2
(45) Date of Patent: Jun. 4, 2024

(54) CARGO CONVEYING DEVICE, CARGO CONVEYING SYSTEM, AND CARGO CONVEYING METHOD

(71) Applicant: TOYOTA JIDOSHA KABUSHIKI KAISHA, Aichi-ken (JP)

(72) Inventors: Tetsuya Kanata, Toyota (JP); Masao Tajima, Toyota (JP); Takashi Hayashi, Toyota (JP); Nobuyuki Tomatsu, Nagoya (JP); Hideki Fukudome, Nisshin (JP); Takashi Hayashi, Nagoya (JP); Yoshiumi Kawamura, Nisshin (JP); Kosuke Akatsuka, Mishima (JP); Manabu Yamamoto, Toyota (JP); Kosuke Sakakibara, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/523,923

(22) Filed: Nov. 11, 2021

(65) Prior Publication Data

US 2022/0162047 A1    May 26, 2022

(30) Foreign Application Priority Data

Nov. 25, 2020   (JP) ................. 2020-195317

(51) Int. Cl.
  *B66F 9/06* (2006.01)
  *B66F 9/075* (2006.01)
(52) U.S. Cl.
  CPC ............ *B66F 9/063* (2013.01); *B66F 9/0755* (2013.01)

(58) Field of Classification Search
  CPC .... B65G 1/065; B65G 1/0492; B65G 1/1375; B66F 9/065; B66F 9/063; B66F 9/0755
  See application file for complete search history.

(56) References Cited

U.S. PATENT DOCUMENTS

| 6,602,037 | B2 * | 8/2003 | Winkler | B65G 1/1375 |
| | | | | 414/281 |
| 11,027,922 | B1 * | 6/2021 | Kayal | B65G 47/44 |
| 2019/0161329 | A1 * | 5/2019 | Ghirardi | B66F 7/0608 |
| 2019/0344699 | A1 | 11/2019 | Radetzki et al. | |

FOREIGN PATENT DOCUMENTS

| CN | 114386889 A | * | 4/2022 | ............. B65G 1/065 |
| CN | 114394443 A | * | 4/2022 | ............ B60P 1/4414 |
| EP | 1136394 A2 | * | 9/2001 | ........... B65G 1/1375 |

(Continued)

OTHER PUBLICATIONS

Office Action in JP Application No. 2020-195317, mailed Jun. 27, 2023, 6pp.

*Primary Examiner* — Kaitlin S Joerger
(74) *Attorney, Agent, or Firm* — HAUPTMAN HAM, LLP

(57) ABSTRACT

A cargo conveying device includes: a horizontal direction conveying section that conveys cargo in a horizontal direction, and that includes a transfer section at which cargo is transferred between the transfer section and a cargo handler; a height adjusting section that adjusts a vertical direction height of the transfer section; and a control section that, at a time at a time at which cargo is transferred between the transfer section and a cargo handler, operates the height adjusting section, and adjusts the vertical direction height of the transfer section.

5 Claims, 11 Drawing Sheets

(56) References Cited

FOREIGN PATENT DOCUMENTS

| JP | S62-50178 U | 3/1987 | | |
|---|---|---|---|---|
| JP | H726729 A | 1/1995 | | |
| JP | H1111844 A | 1/1999 | | |
| JP | 2020-090151 A | 6/2020 | | |
| WO | WO-2014207021 A1 | * 12/2014 | ........... | B65G 1/0492 |
| WO | WO-2019224282 A1 | * 11/2019 | ........... | B65G 1/0492 |

* cited by examiner

CARGO CONVEYING DEVICE, CARGO CONVEYING SYSTEM, AND CARGO CONVEYING METHOD

CROSS-REFERENCE TO RELATED APPLICATION

This application is based on and claims priority under 35 USC 119 from Japanese Patent Application No. 2020-195317 filed on Nov. 25, 2020, the disclosure of which is incorporated by reference herein.

BACKGROUND

Technical Field

The present disclosure relates to a cargo conveying device, a cargo conveying system, and a cargo conveying method.

Related Art

A conveying method that conveys cargo to the respective floors at the time of constructing a building is disclosed in Japanese Patent Application Laid-Open (JP-A) No. H07-26729. In the conveying method disclosed in this document, a raising/lowering device is provided within an elevator shaft. A first hoist rail, which faces the elevator entrance/exit, is mounted to the raising/lowering device. A second hoist rail is provided on a floor of the building. A trolley hoist is engaged with the first hoist rail and the second hoist rail. In the state in which the trolley hoist is positioned on the first hoist rail, the cargo is suspended at the first hoist rail. Next, the cargo is moved vertically due to the raising/lowering device being moved in the vertical direction within the elevator shaft. Next, the raising/lowering device is made to stand still at a position corresponding to the floor at which the second hoist rail is provided, and the end portion of the first hoist rail and the end portion of the second hoist rail are set face-to-fact to one another and are connected together. Then, the cargo is moved horizontally due to the trolley hoist being made to travel along the first hoist rail and the second hoist rail. Cargo may be conveyed to each floor in the building in this way.

In a cargo conveying device and cargo conveying system that include a step of transferring the conveyed cargo between the device and a cargo handler, it is desirable to be able to reduce the load on the cargo handler. In the conveying method disclosed in JP-A No. H07-26729, there is room for improvement with regard to this point.

SUMMARY

In view of the above-described circumstances, the present disclosure provides a cargo conveying device, a cargo conveying system, and a cargo conveying method that may reduce the load on a cargo handler.

A first aspect of the present disclosure is a cargo conveying device including: a horizontal direction conveying section that conveys cargo in a horizontal direction, and that includes a transfer section at which cargo is transferred between the transfer section and a cargo handler; a height adjusting section that adjusts a vertical direction height of the transfer section; and a control section that, at a time at a time at which cargo is transferred between the transfer section and a cargo handler, operates the height adjusting section, and adjusts the vertical direction height of the transfer section.

In accordance with the first aspect, cargo is conveyed in the horizontal direction by the horizontal direction conveying section. At the transfer section of the horizontal direction conveying section, the cargo is transferred between the transfer section and a cargo handler. Here, the control section operates the height adjusting section at the time when cargo is transferred between the transfer section and the cargo handler. Due thereto, the vertical direction height of the cargo at the transfer section is adjusted, and the load on the cargo handler may be reduced.

The first aspect may further include a vertical direction conveying section that conveys cargo in a vertical direction.

In accordance with the above-described structure, cargo may be conveyed in the vertical direction and the horizontal direction by the vertical direction conveying section and the horizontal direction conveying section.

In the first aspect, the control section may adjust the vertical direction height of the transfer section to a height that corresponds to at least one of a physique or a posture of the cargo handler.

In accordance with the above-described structure, the vertical direction height of the cargo at the transfer section is adjusted to a height that corresponds to at least one of the physique and the posture of the cargo handler. Due thereto, the load on the cargo handler may be reduced even more.

The first aspect may further include a sensor that detects at least a portion of a body of the cargo handler, wherein: the control section may estimate the at least one of the physique or the posture of the cargo handler based on a signal from the sensor, and the control section may adjust the height of the transfer section based on the at least one of the physique or the posture of the cargo handler that has been estimated.

In accordance with the above-described structure, the control section estimates at least one of the physique and the posture of the cargo handler based on a signal from the sensor. Due thereto, the vertical direction height of the cargo at the transfer section may be adjusted while taking individual differences in physiques and postures of cargo handlers into consideration.

The first aspect may further include a physique information input section at which physique information of the cargo handler is input, wherein the control section may adjust the height of the transfer section based on the physique information of the cargo handler that has been input at the physique information inputting section.

In accordance with the above-described structure, physique information of the cargo handler is inputted at the physique information inputting section. Due thereto, the vertical direction height of the cargo at the transfer section may be adjusted while taking individual differences in physiques and postures of cargo handlers into consideration.

In the first aspect, the control section may adjust the vertical direction height of the transfer section to a height that is greater than or equal to a height of a waist of the cargo handler and that is at a position that faces the cargo handler in a horizontal direction.

In accordance with the above-described structure, the vertical direction height of the cargo at the transfer section is adjusted to a height that is greater than or equal to the height of the waist of the cargo handler and that is at a position that faces the cargo handler in the horizontal direction. Due thereto, the load on the lumbar region of the cargo handler may be reduced effectively.

A second aspect of the present disclosure is a cargo conveying system including: the cargo conveying device of the first aspect; a second cargo conveying device that conveys cargo and at which cargo is transferred between the cargo conveying device and the second cargo conveying device, wherein cargo is conveyed between a distribution warehouse and a cargo handler using the cargo conveying device and the second cargo conveying device.

In accordance with the second aspect, cargo is conveyed between a distribution warehouse and a cargo handler by using the cargo conveying device and the second cargo conveying device. Here, in accordance with the cargo conveying device that structures a portion of the cargo conveying system, the cargo is conveyed in the horizontal direction by the horizontal direction conveying section. At the transfer section of the horizontal direction conveying section, the cargo is transferred between the transfer section and the cargo handler. Here, the control section operates the height adjusting section at the time when cargo is transferred between the transfer section and the cargo handler. Due thereto, the vertical direction height of the cargo at the transfer section is adjusted, and the load on the cargo handler may be reduced.

A third aspect of the present disclosure is a method of operating the cargo conveying device of the first aspect, including: receiving at least one of physique information or posture information of a cargo handler; and adjusting the vertical direction height of the transfer section based on the at least one of the physique information or the posture information of the cargo handler that has been received.

In the third aspect, the cargo conveying device may a sensor that detects at least a portion of a body of a cargo handler, receiving the at least one of physique information or posture information of the cargo handler may include receiving of a signal from the sensor, and the method may further include: estimating at least one of a physique or a posture of the cargo handler based on the signal from the sensor; and adjusting the height of the transfer section based on the at least one of the physique or the posture of the cargo handler that has been estimated.

In accordance with the cargo conveying device, the cargo conveying system, and the cargo conveying method relating to the present disclosure, load on a cargo handler may be reduced.

DETAILED DESCRIPTION

Figure 1:
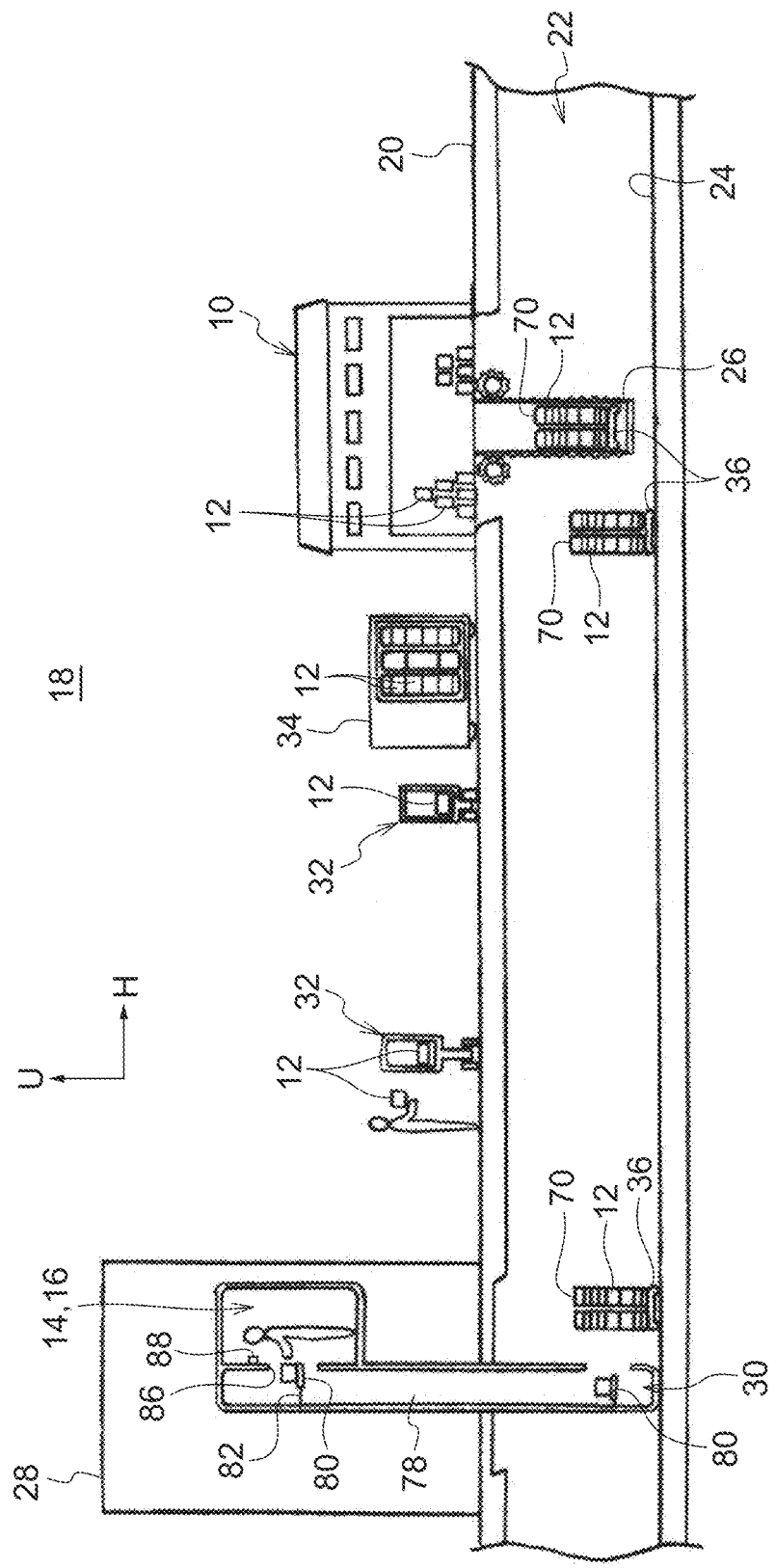
FIG. 1 is a schematic drawing illustrating a portion of a city in which a cargo conveying system of a present embodiment is applied.

A cargo conveying system, cargo conveying device, and a cargo conveying method relating to an embodiment of the present disclosure are described by using FIG. 1 through FIG. 7. Note that arrow U that is illustrated appropriately in the drawings indicates upward in the vertical direction, and arrow H indicates one direction in the horizontal direction.

As illustrated in FIG. 1, the cargo conveying system of the present embodiment is a system that, for example, is used to deliver cargo 12 that are collected in a distribution warehouse 10 to delivery destinations 14, or is used to deliver the cargo 12 from a requester 16 to the distribution warehouse 10.

The distribution warehouse 10 is a distribution base to which the cargo 12, which are to be delivered to the respective delivery destinations 14 that are within a predetermined area 18, are brought from other areas, and at which the cargo 12, which are to be sent out from requesters 16 within the predetermined area 18, are brought. This distribution warehouse 10 is provided on ground 20 of the area 18. An underground passage 24 for distribution is provided in an underground 22 of the area 18 at which the distribution warehouse 10 is provided. The underground passage 24 and the distribution warehouse 10 are connected in the vertical direction. By using a lift 26 that serves as the second conveying device, the cargo 12 and the like (including racks 70, third transporting vehicles 36 and the like that are described later) that are within the underground passage 24 may be moved into the distribution warehouse 10, and the cargo 12 and the like that are within the distribution warehouse 10 may be moved into the underground passage 24. Further, a building 28 that is provided in the area 18 and the underground passage 24 are connected in the vertical direction. By using a conveying device 30 for a building that serves as the cargo conveying device, the cargo 12 that are within the underground passage 24 may be moved into the building 28, and the cargo 12 that are within the building 28 may be moved into the underground passage 24.

The transporting of the cargo 12 on the ground 20 is carried out mainly by first transporting vehicles 32 that serve as the cargo transporting devices, and a second transporting vehicle 34 that serves as the second conveying device. Further, the transporting of the cargo 12 in the underground passage 24 is carried out mainly by the third transporting vehicles 36 that serve as the second conveying devices.

Figure 2:
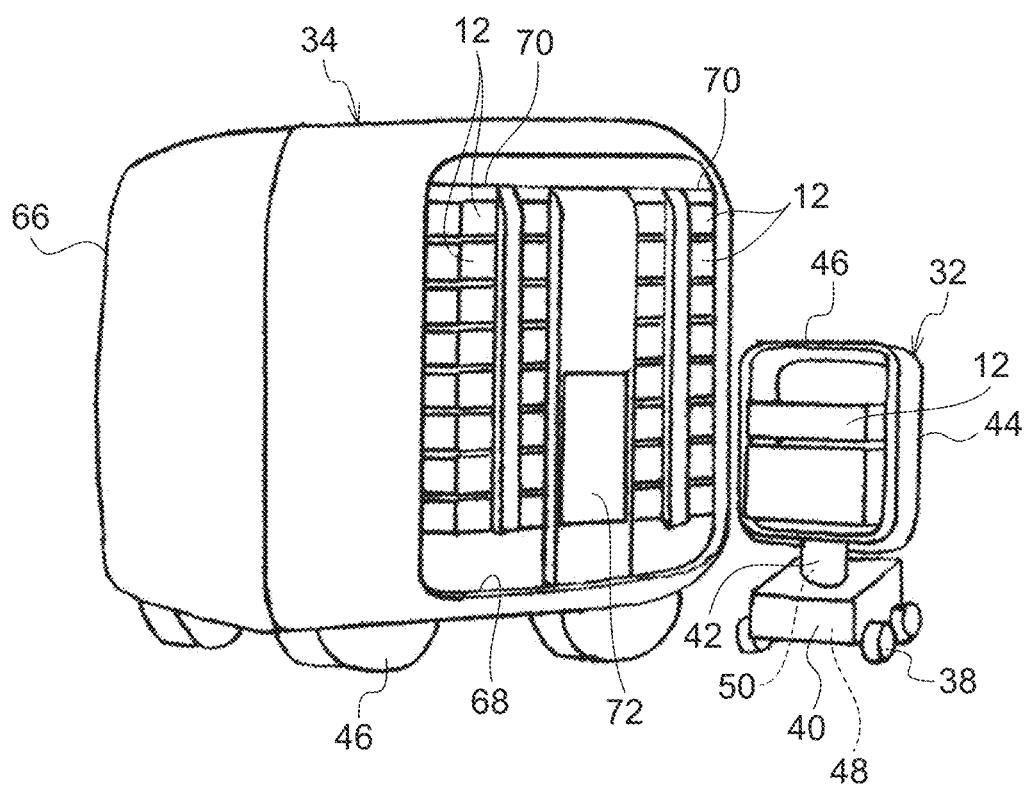
FIG. 2 is a perspective view illustrating a first conveying vehicle and a second conveying vehicle.
Figure 3:
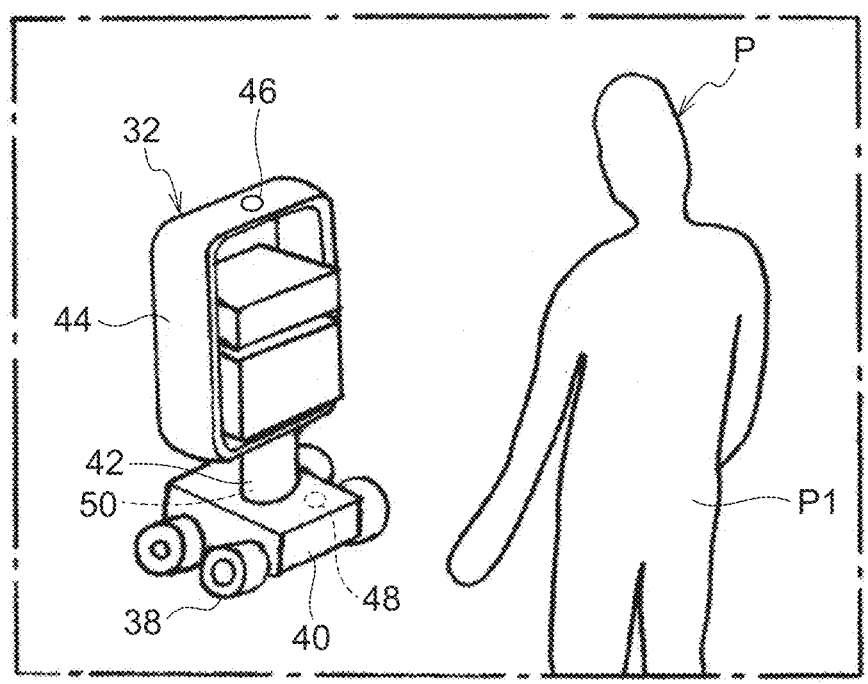
FIG. 3 is a perspective view illustrating a cargo handler and the first conveying vehicle.
Figure 4:
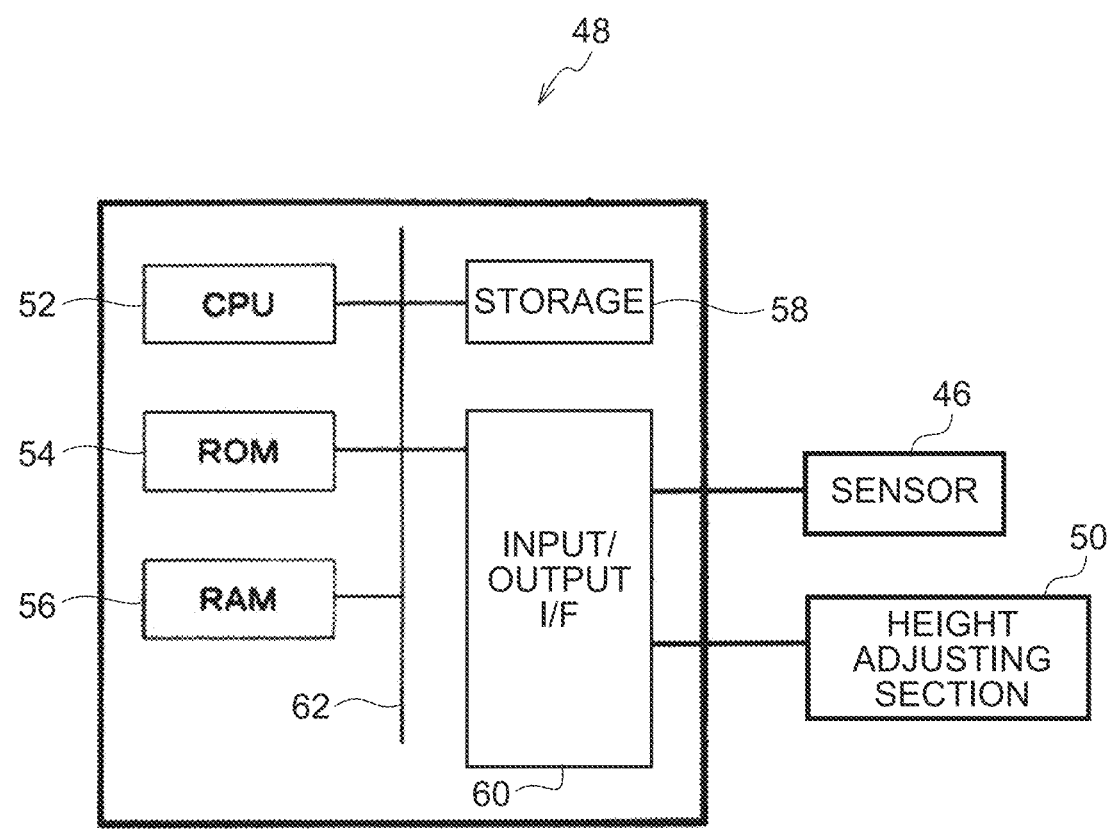
FIG. 4 is a block drawing illustrating a control section and the like of the first conveying vehicle.
Figure 5:
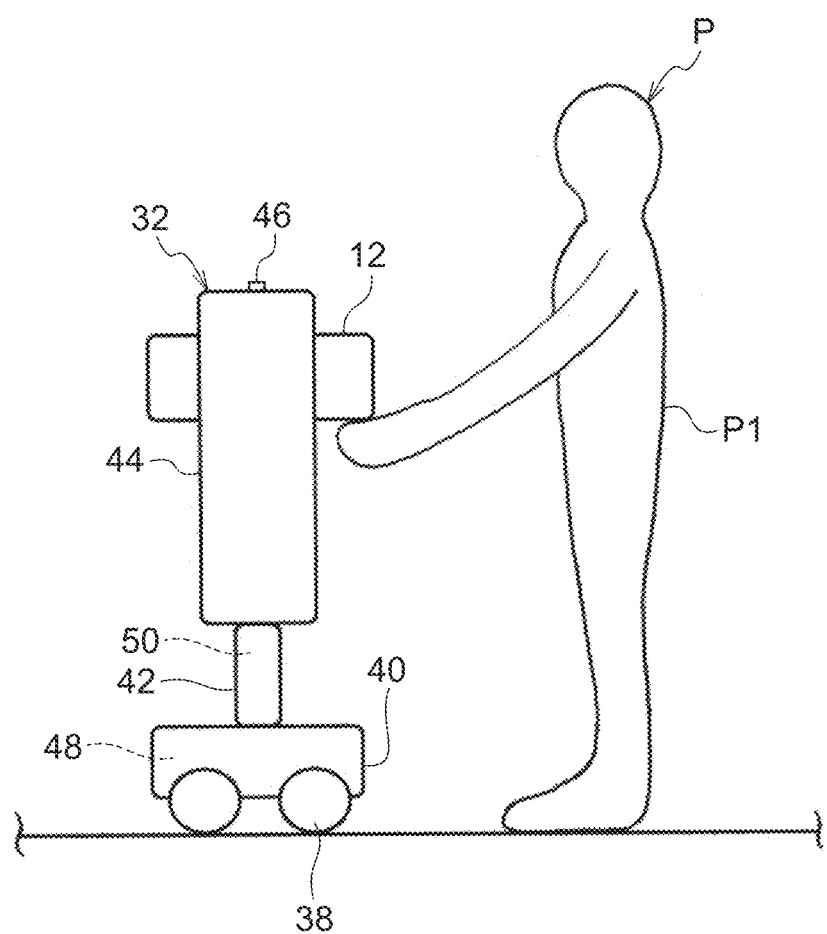
FIG. 5 is a side view illustrating the cargo handler and the first conveying vehicle.

As illustrated in FIG. 2 and FIG. 3, the first transporting vehicle 32 includes a base 40 that serves as the horizontal direction conveying section and that travels on the ground due to wheels 38 rotating, and a post 42 that stands upright at the base 40. Further, the first transporting vehicle 32 includes a cargo supporting section 44, which serves as a transfer section that is supported at the base 40 via the post 42 and by which the cargo 12 is transferred between a cargo handler P and the second transporting vehicle 34, and a sensor 46 that detects the situation at the periphery. As illustrated in FIG. 3 and FIG. 4, a motor and a battery that cause the wheels 38 to rotate, and a control section 48 that controls the respective sections of the first transporting vehicle 32, and the like, are stored in the base 40. Further, the cargo supporting section 44 is formed in the shape of a rectangular frame. The cargo 12 is supported at the inner side of this cargo supporting section 44. Moreover, a height adjusting section 50 that adjusts the vertical direction position of the cargo supporting section 44 is provided at the post 42. As illustrated in FIG. 3 and FIG. 5, the vertical direction position of the cargo supporting section 44 is adjusted due to this height adjusting section 50 being operated.

As illustrated in FIG. 4, the control section 48 includes a Central Processing Unit: processor (CPU) 52, a Read Only Memory (ROM) 54, a Random Access Memory (RAM) 56, a storage 58, and an input/output interface (I/F) 60 that carries out communication with external devices and the like. The CPU 52, the ROM 54, the RAM 56, the storage 58 and the input/output interface 60 are connected so as to be able to communicate with one another via a bus 62. The above-described sensor 46 and height adjusting section 50 and the like are connected to the input/output interface 60. The CPU 52 is a central computing processing unit, and executes various programs, and controls the motor, the cargo supporting section 44, and the height adjusting section 50. Namely, based on a signal from the sensor 46, the CPU 52 reads-out a control program from the ROM 54 or the storage 58, and executes the control program by using the RAM 56 as a workspace, and controls the operation of the height adjusting section 50.

As illustrated in FIG. 2, the second transporting vehicle 34 is a transporting vehicle that is larger than the first transporting vehicle 32. The second transporting vehicle 34 includes a vehicle body 66 that travels on the ground due to wheels 64 rotating. A motor and battery that cause the wheels 64 to rotate, and a controller and the like are accommodated in the vehicle body 66. Further, a rack placement section 68 that passes-through in the vehicle transverse direction of the second transporting vehicle 34, is provided at the vehicle body 66. The plural racks 70, on which the cargo 12 are accommodated in states of being stacked in the vertical direction, are disposed in this rack placement section 68. Two of the racks 70 are disposed in the rack placement section 68 that is illustrated in FIG. 2, in a state of being lined-up in the vehicle longitudinal direction of the second transporting vehicle 34. Note that it suffices to set the number of the racks 70, which are disposed in the rack placement section 68, appropriately in accordance with the size of the vehicle body 66 of the second transporting vehicle 34. A storing/takeout device 72, which is for storing the cargo 12 in the racks 70 that are disposed in the rack placement section 68 or removing the cargo 12 from the racks 70 that are disposed in the rack placement section 68, is provided at the vehicle body 66. Transferring of the cargo 12 between the first transporting vehicle 32 and the second transporting vehicle 34 is carried out via this storing/takeout device 72.

Figure 6:
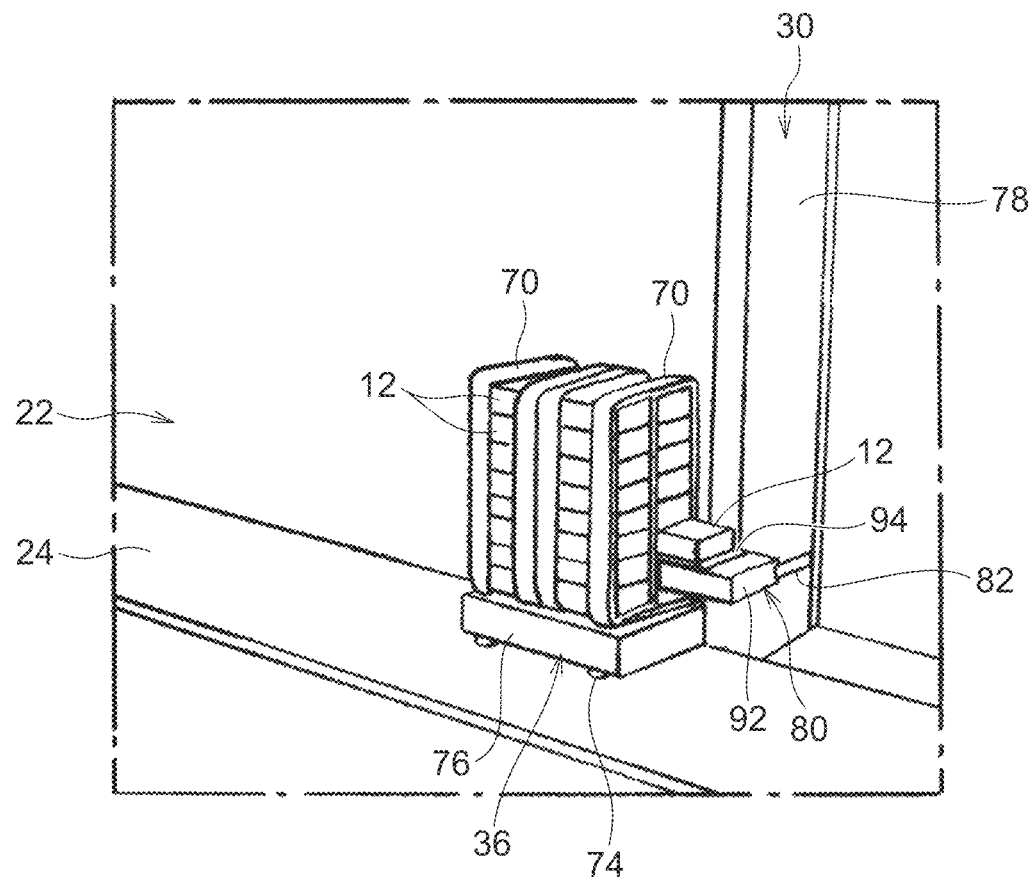
FIG. 6 is a perspective view illustrating a third conveying vehicle and a conveying device for a building.

As illustrated in FIG. 6, the third transporting vehicle 36 includes a rack supporting section 76 that travels on the ground due to wheels 74 rotating. A motor and a battery that cause the wheels 74 to rotate, and a controller and the like, are stored in the rack supporting section 76. The racks 70 are supported at the rack supporting section 76 in a state in which the racks 70 are loaded on the rack supporting section 76. Note that transferring of the racks 70 is carried out between the third transporting vehicle 36 and the second transporting vehicle 34 (see FIG. 2). The transferring of the racks 70 between the third transporting vehicle 36 and the second transporting vehicle 34 (see FIG. 2) is carried out automatically or via the cargo handler P.

Figure 7:
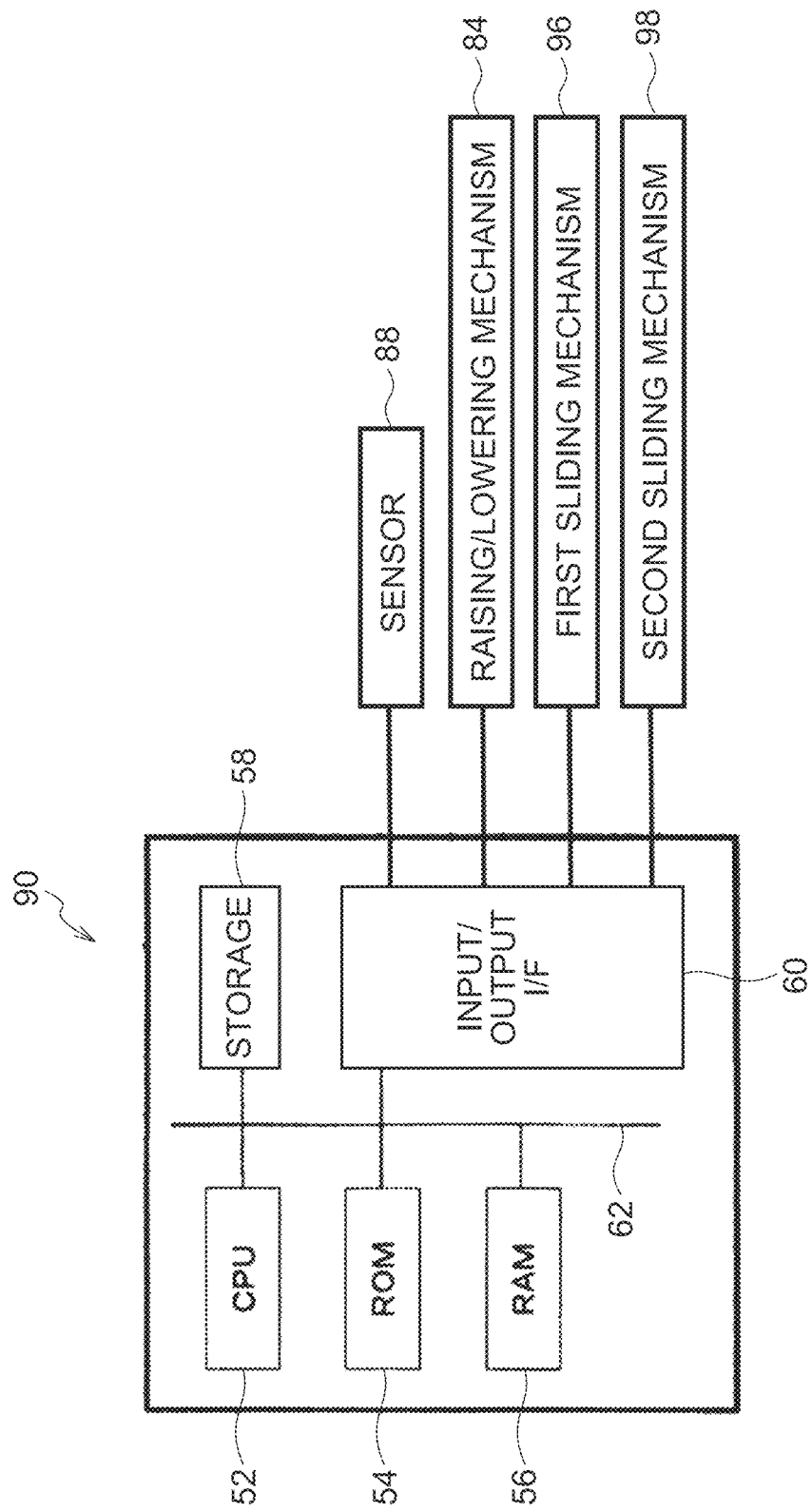
FIG. 7 is a block drawing illustrating the conveying device for a building.

As illustrated in FIG. 1, FIG. 6 and FIG. 7, the conveying device 30 for a building includes a loading section 80 that serves as the vertical direction conveying section, the horizontal direction conveying section and the transfer section, and that moves in the vertical direction within a raising/lowering path 78 that is the space connecting the building 28 and the underground passage 24 in the vertical direction. Further, the conveying device 30 for a building includes a supporting arm 82 that supports the loading section 80 such that the loading section 80 may slide in one direction in the horizontal direction and in the direction opposite thereto. Moreover, the conveying device 30 for a building includes a raising/lowering mechanism 84 that serves as the height adjusting section and that moves the loading section 80 in the vertical direction by moving the supporting arm 82 in the vertical direction. Further, the conveying device 30 for a building includes a sensor 88 that detects the situation at the periphery of a transfer opening 86 that is described later, and a control section 90 that controls the respective mechanisms that structure the conveying device 30 for a building.

The loading section 80 includes a loading section main body 92 that is supported by the supporting arm 82, and a sliding plate 94 that structures the top surface portion of the loading section 80 and is supported so as to be able to slide with respect to the loading section main body 92. Here, the sliding direction of the sliding plate 94 with respect to the loading section main body 92 is direction that is a horizontal direction and is orthogonal to the sliding direction of the loading section 80 with respect to the supporting arm 82. A first sliding mechanism 96, which slides the loading section 80 with respect to the supporting arm 82, and a second sliding mechanism 98, which slides the sliding plate 94 with respect to the loading section main body 92, are provided within the loading section main body 92.

The basic structure of the control section 90 of the conveying device 30 for a building is similar to that of the control section 48 of the above-described first transporting vehicle 32. Note that portions, which correspond to the control section 48 of the first transporting vehicle 32 that is illustrated in FIG. 4, of the control section 90 of the conveying device 30 for a building that is illustrated in FIG. 7 are denoted by the same reference numerals as those of the control section 48 of the first transporting vehicle 32. Further, the sensor 88, the raising/lowering mechanism 84, the first sliding mechanism 96, the second sliding mechanism 98 and the like are connected to the input/output interface 60 of the control section 90 of the conveying device 30 for a building. Based on a signal from the sensor 46, the CPU 52 reads-out a control program from the ROM 54 or the storage 58, and executes the control program by using the RAM 56 as a workspace, and controls the operations of the raising/lowering mechanism 84, the first sliding mechanism 96, and the second sliding mechanism 98.

As illustrated in FIG. 6, in the state in which the loading section 80 is disposed at a position corresponding to the underground passage 24, the control section 90 operates the first sliding mechanism 96, and places the loading section 80 at a position adjacent to the third transporting vehicle 36 within the underground passage 24. Next, due to the control section 90 operating the second sliding mechanism 98 and operating the raising/lowering mechanism 84, the predetermined cargo 12 that is stored in the rack 70 on the third transporting vehicle 36 is taken-out. Next, the control section 90 operates the first sliding mechanism 96, and moves the loading section 80 and the cargo 12 that is placed on the loading section 80 into the raising/lowering path 78. Next, due to the control section 90 operating the raising/lowering mechanism 84, the loading section 80 and the cargo 12 that is placed on the loading section 80 are raised. Due thereto, as illustrated in FIG. 1, the cargo 12 may be delivered to a predetermined delivery destination 14 of the building 28. Note that the transfer opening 86, through which the loading section 80 and the cargo 12 that is placed on the loading section 80 may pass, is formed in a wall or the like of the delivery destination 14. Note that the cargo 12 from the requester 16 within the building 28 may be stored in the rack 70 that is on the third transporting vehicle 36 by processes that are opposite to the processes that are described above. Here, the sensor 88, which detects the situation of the periphery of the transfer opening 86, is provided at the wall or the like of the delivery destination 14 and the requester 16.

(Function of Reducing Load on Cargo Handler P)

As illustrated in FIG. 1, the first transporting vehicles 32 and the conveying device 30 for a building that structure portions of the cargo conveying system of the above-described embodiment include the function of reducing the load on the cargo handler P.

(Function of First Transporting Vehicle 32 for Reducing Load on Cargo Handler P)

As illustrated in FIG. 3 and FIG. 5, the first transporting vehicle 32 reduces the load on the cargo handler P by adjusting the vertical direction height of the cargo supporting section 44 at the time when the cargo 12 is transferred between the first transporting vehicle 32 and the cargo handler P.

Figure 8:
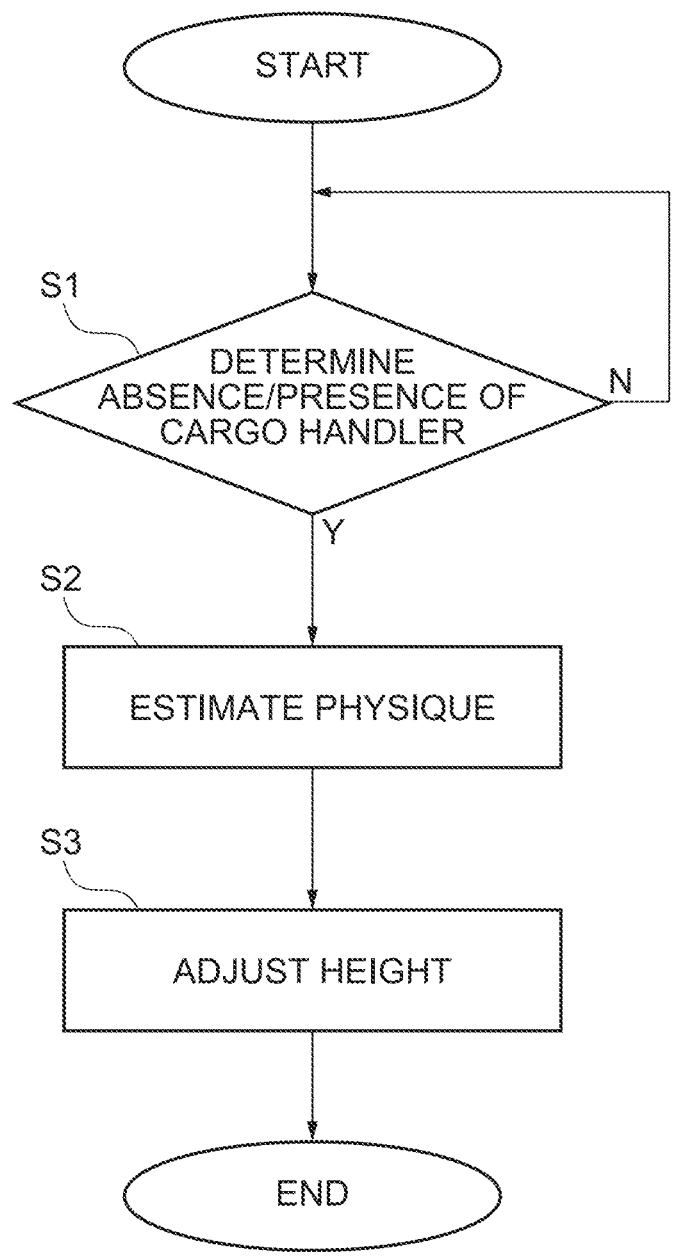
FIG. 8 is a flowchart for explaining control by the control section of a first transporting vehicle.

Specifically, as illustrated in FIG. 3, FIG. 5 and FIG. 8, in step S1, based on information from the sensor 46, the control section 48 of the first transporting vehicle 32 determines whether or not there is a cargo handler P near to that first transporting vehicle 32. Note that the sensor 46 is a camera or an infrared sensor or the like. If the determination in step S1 is negative, the control section 48 carries out the processing of step S1 again. If the determination in step S1 is affirmative, in step S2, the control section 48 estimates the physique of the cargo handler P based on information from the sensor 46. Note that the estimating of the physique of the cargo handler P is carried out by comparing the information from the sensor 46 and data that is stored in the control section 48. As an example, the sensor 46 is a camera, the position of the eyes of the cargo handler P are detected by the camera by image processing, and the height (the height from the ground) of the eyes is computed. Due thereto, the height of the cargo handler P is estimated, and his/her physique is estimated. Further, as another example, a point of the skeleton of the cargo handler P that is detected by the camera, and data of points of skeletons that are stored within the control section 48, are compared, and the physique is thereby estimated. Next, in step S3, due to the control section 48 operating the height adjusting section 50, the height of the cargo supporting section 44 is adjusted to a height corresponding to the physique of the cargo handler P that has been estimated in step S2. In detail, the height of the cargo supporting section 44 (the portion where the cargo 12 that is to be handled by the cargo handler P is supported) is adjusted to a height that is greater than or equal to the height of waist P1 and that is at a position that faces, in the horizontal direction, the cargo handler P who is in a standing posture. Due thereto, the cargo handler P who is in a standing posture may receive the specific cargo 12 that is supported by the cargo supporting section 44 without bending his/her waist or knees. Further, the cargo handler P may make the cargo supporting section 44 support the specific cargo 12 without the cargo handler P who is in a standing posture bending his/her waist or knees. In this way, at the first transporting vehicle 32 that structures a portion of the cargo conveying system relating to the present embodiment, load at the time when the cargo handler P handles the cargo 12 may be reduced.

(Function of Conveying Device 30 for a Building for Reducing Load on Cargo Handler P)

Figure 9:
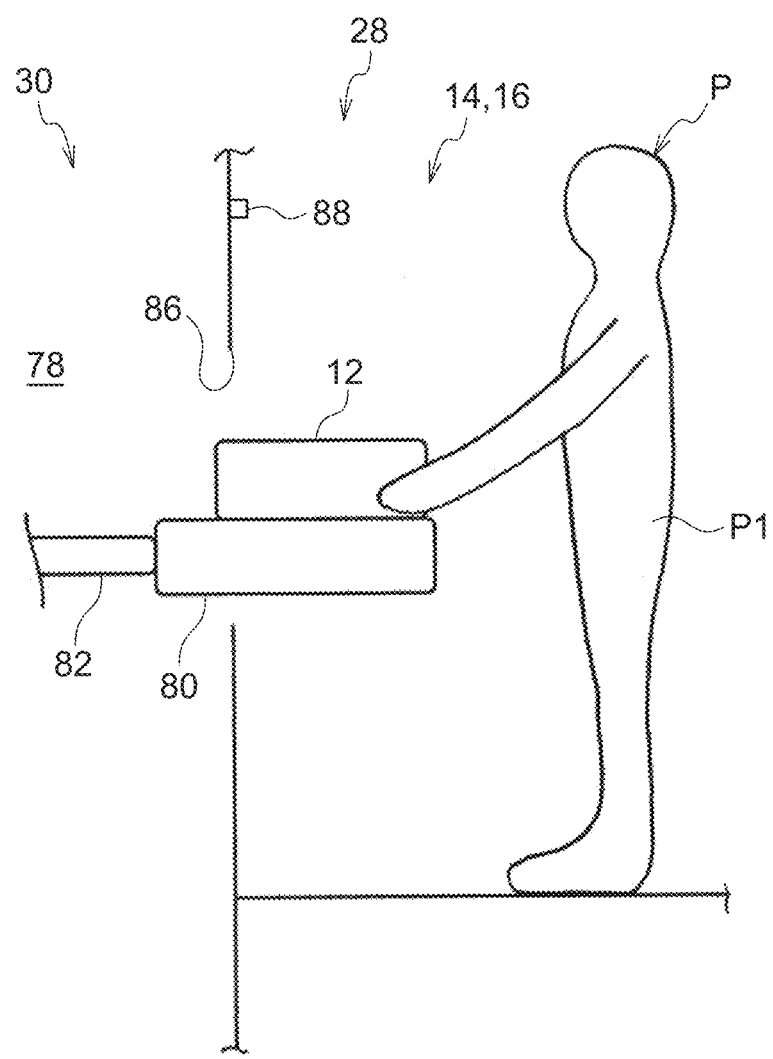
FIG. 9 is a side view illustrating the conveying device for a building, and a delivery destination and a requester.

As illustrated in FIG. 6, FIG. 7 and FIG. 9, the conveying device 30 for a building reduces load on the cargo handler P by adjusting the vertical direction height of the loading section 80 at the time when the cargo 12 is transferred between the conveying device 30 for a building and the cargo handler P.

Figure 10:
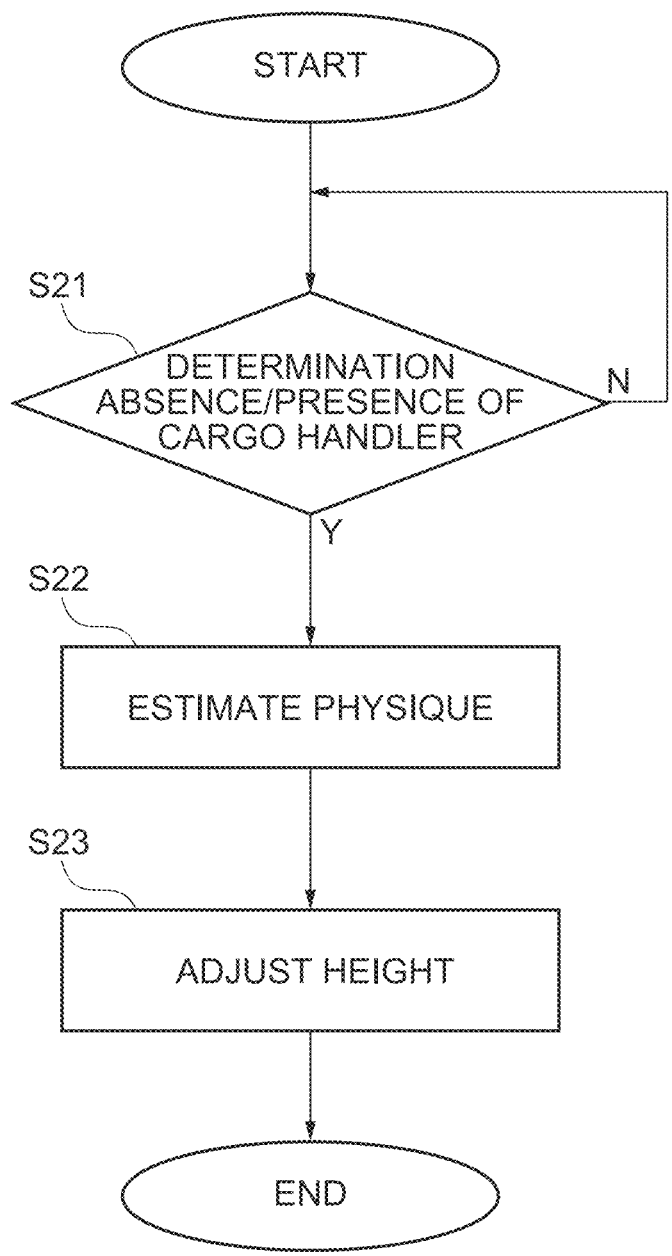
FIG. 10 is a flowchart for explaining control by a control section of the conveying device for a building.

Specifically, as illustrated in FIG. 7, FIG. 9 and FIG. 10, in step S21, based on information from the sensor 88, the control section 90 of the conveying device 30 for a building determines whether or not there is a cargo handler P near to the transfer openings 86 of the delivery destination 14 and the requester 16. Note that the sensor 88 is a camera or an infrared sensor or the like. If the determination in step S21 is negative, the control section 90 carries out the processing of step S21 again. In contrast, if the determination in step S21 is affirmative, in step S22, the control section 90 estimates the physique of the cargo handler P based on information from the sensor 88. Note that the estimating of the physique of the cargo handler P is carried out by comparing the information from the sensor 88 and data that is stored in the control section 90. Next, in step S23, due to the control section 90 operating the raising/lowering mechanism 84, the height of the loading section 80 is adjusted to a height corresponding to the physique of the cargo handler P that has been estimated in step S22. In detail, the height of the loading section 80 (the height of the top surface of the loading section 80) is adjusted to a height that is greater than or equal to the height of the waist P1 and that is at a position that faces, in the horizontal direction, the cargo handler P who is in a standing posture. Due thereto, the cargo handler P who is in a standing posture may receive the cargo 12 that is on the loading section 80 without bending his/her waist or knees. Further, the cargo handler P may place the cargo 12 on the loading section 80 without the cargo handler P who is in a standing posture bending his/her waist or knees. In this way, at the conveying device 30 for a building that structures a portion of the cargo conveying system relating to the present embodiment, load at the time when the cargo handler P handles the cargo 12 may be reduced.

Note that the above example describes an example in which the height of the cargo supporting section 44 or the loading section 80 is adjusted such that the cargo handler P who is in a standing posture may transfer the cargo 12 without bending his/her knees or waist. However, the present disclosure is not limited to this. For example, the posture of the cargo handler P who is seated in a chair or a wheelchair or the like may be estimated, and the height of the cargo supporting section 44 or the loading section 80 adjusted. Or, both the physique and the posture of the cargo handler P may be estimated, and the height of the cargo supporting section 44 or the loading section 80 adjusted. Moreover, the height of the cargo supporting section 44 or the loading section 80 may be adjusted while taking into consideration the horizontal distance between the cargo handler P and the cargo supporting section 44 or the loading section 80. Still further, the height of the cargo supporting section 44 or the loading section 80 may be adjusted while taking into consideration the clothes of the cargo handler P.

Figure 11:
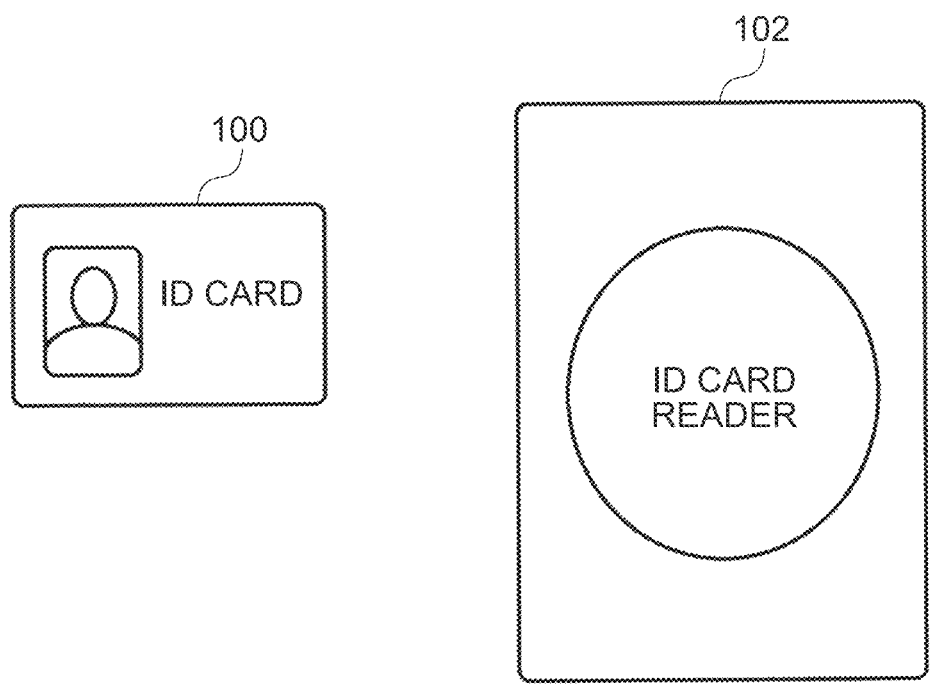
FIG. 11 is a schematic drawing illustrating an ID card and an ID card reader.

Further, although the above example describes an example in which the physique of the cargo handler P is estimated based on information from the sensor 46, 88, the present disclosure is not limited to this. For example, as illustrated in FIG. 11, an ID card 100, on which physique information of the cargo handler P is recorded, may be read-in by an ID card reader 102 that serves as a physique information inputting section. Then, the control section 48, 90 may adjust the height of the cargo supporting section 44 or the loading section 80 based on the physique information of the cargo handler P that is read-in by the ID card reader 102.

Although an embodiment of the present disclosure has been described above, the present disclosure is not limited to the above, and may, of course, be implemented by being modified in various ways other than the above, within a scope that does not depart from the gist thereof

What is claimed is:

1. A cargo conveying device, comprising:
   a horizontal direction conveying section configured to convey cargo in a horizontal direction, and including a transfer section at which the cargo is transferred between the transfer section and a cargo handler;
   a height adjusting section configured to adjust a vertical direction height of the transfer section;
   a control section configured to, at a time at which the cargo is transferred between the transfer section and the cargo handler, operate the height adjusting section to adjust the vertical direction height of the transfer section; and
   a sensor provided at the transfer section and configured to automatically detect whether the cargo handler is near the cargo conveying device,
   wherein
   the sensor is configured to, in response to detecting the cargo handler being near the cargo conveying device, automatically detect at least a portion of a body of the cargo handler,
   the control section is configured to
      estimate at least one of a physique or a posture of the cargo handler based on a signal from the sensor, and
      operate the height adjusting section to adjust the vertical direction height of the transfer section based on the at least one of the physique or the posture of the cargo handler that has been estimated,
   the sensor includes a camera, and
   the control section is configured to estimate the at least one of the physique or the posture of the cargo handler based on a position of eyes of the cargo handler in an image captured by the camera by performing image processing on the image captured by the camera.

2. The cargo conveying device of claim 1, further comprising a vertical direction conveying section configured to convey cargo in a vertical direction.

3. The cargo conveying device of claim 1, wherein the control section is configured to operate the height adjusting section to adjust the vertical direction height of the transfer section to a height that is greater than or equal to a height of a waist of the cargo handler and that is at a position that faces the cargo handler in the horizontal direction.

4. A cargo conveying system, comprising:
   a first cargo conveying device;
   wherein
   the first cargo conveying device includes
      a horizontal direction conveying section configured to convey cargo in a horizontal direction, and including a transfer section at which the cargo is transferred between the transfer section and a cargo handler;
      a height adjusting section configured to adjust a vertical direction height of the transfer section;
      a control section configured to, at a time at which the cargo is transferred between the transfer section and the cargo handler, operate the height adjusting section to adjust the vertical direction height of the transfer section; and
      a sensor provided at the transfer section and configured to automatically detect whether the cargo handler is near the cargo conveying device,
   the sensor is configured to, in response to detecting the cargo handler being near the cargo conveying device, automatically detect at least a portion of a body of the cargo handler,
   the control section is configured to
      estimate at least one of a physique or a posture of the cargo handler based on a signal from the sensor, and
      operate the height adjusting section to adjust the vertical direction height of the transfer section based on the at least one of the physique or the posture of the cargo handler that has been estimated; and
   a second cargo conveying device which is configured to convey cargo and at which cargo is transferred between the first cargo conveying device and the second cargo conveying device,
   wherein
   the first cargo conveying device and the second cargo conveying device are configured to convey cargo between a distribution warehouse and the cargo handler,
   the sensor includes a camera, and
   the control section is configured to estimate the at least one of the physique or the posture of the cargo handler based on a position of eyes of the cargo handler in an image captured by the camera by performing image processing on the image captured by the camera.

5. A method of operating the cargo conveying device of claim 1, the method comprising:
   conveying, by the horizontal direction conveying section of the cargo conveying device, cargo in the horizontal direction, the cargo being transferred between the transfer section of the horizontal direction conveying section and the cargo handler; and
   operating, by the control section of the cargo conveying device at the time at which the cargo is transferred between the transfer section and the cargo handler, the height adjusting section of the cargo conveying device to adjust the vertical direction height of the transfer section,
   wherein the method further comprises:
      automatically detecting, by the sensor provided at the transfer section of the cargo conveying device, whether the cargo handler is near the cargo conveying device;
      in response to detecting the cargo handler being near the cargo conveying device, automatically detecting at least the portion of the body of the cargo handler;
      estimating, by the control section, the at least one of the physique or the posture of the cargo handler based on the signal from the sensor; and
      operating, by the control section, the height adjusting section to adjust the vertical direction height of the transfer section based on the at least one of the physique information or the posture information of the cargo handler that has been estimated.

* * * * *